(12) United States Patent
So et al.

(10) Patent No.: US 8,149,893 B2
(45) Date of Patent: Apr. 3, 2012

(54) RELIABLE WIRELESS COMMUNICATION SYSTEM USING ADAPTIVE FREQUENCY HOPPING

(75) Inventors: Hoi-Sheung Wilson So, Sunnyvale, CA (US); Raghuveer Chereddy, Fremont, CA (US); Raymond Rui-Feng Liao, Pleasanton, CA (US)

(73) Assignee: Siemens Aktiengesellschaft, Munich (DE)

( * ) Notice: Subject to any disclaimer, the term of this patent is extended or adjusted under 35 U.S.C. 154(b) by 730 days.

(21) Appl. No.: 12/338,372

(22) Filed: Dec. 18, 2008

(65) Prior Publication Data

US 2010/0046583 A1 Feb. 25, 2010

Related U.S. Application Data

(60) Provisional application No. 61/091,275, filed on Aug. 22, 2008.

(51) Int. Cl.
*H04B 1/7136* (2011.01)
(52) U.S. Cl. ........................................................ 375/132
(58) Field of Classification Search .................. 375/132, 375/133, 135, 136
See application file for complete search history.

(56) References Cited

U.S. PATENT DOCUMENTS

| | | | |
|---|---|---|---|
| 5,848,095 A | 12/1998 | Deutsch | |
| 6,704,346 B1 | 3/2004 | Mansfield | |
| 7,035,314 B1 * | 4/2006 | Linsky | 375/133 |
| 7,079,516 B2 | 7/2006 | You et al. | |
| 7,120,138 B2 | 10/2006 | Soomro et al. | |
| 7,236,511 B2 | 6/2007 | Batra et al. | |
| 7,379,447 B2 | 5/2008 | Dunagan et al. | |
| 2002/0188723 A1 | 12/2002 | Choi et al. | |
| 2003/0171116 A1 | 9/2003 | Soomro | |
| 2003/0223475 A1 | 12/2003 | Hatton | |
| 2005/0128982 A1 | 6/2005 | Kitchin | |
| 2006/0013172 A1 * | 1/2006 | Ruuska et al. | 370/338 |
| 2008/0298450 A1 * | 12/2008 | Zhang et al. | 375/227 |

FOREIGN PATENT DOCUMENTS

| | | |
|---|---|---|
| WO | WO 03/071706 A1 | 8/2003 |
| WO | WO 2007/009043 | 1/2007 |

OTHER PUBLICATIONS

Park, et al., *Coexistence mechanism based on adaptive frequency hopping for interference-limited wpan applications*, Signal Processing and Its Applications, vol. 1, Jul. 1, 2003, pp. 269-272.
Search report and Written Opinion from PCT counterpart application No. PCT/US2009/003310, Sep. 4, 2009, 10 pages.
Standard: Bluetooth Specification Version 2.0, section 2.6.3., "Adapted hop selection kernel" IEEE Std 802.15.1, p. 84-85 (total 2pgs.).

* cited by examiner

*Primary Examiner* — Kevin Kim
(74) *Attorney, Agent, or Firm* — Donald B. Paschburg (57) ABSTRACT

A method and system, the method including determining a frequency quality measurement value for each of a plurality of frequencies a network coordinator can use in a frequency hopping sequence for communicating with a client, classifying each of the plurality of communication frequencies into one of a plurality of different categories based on a relative ranking of the determined frequency quality measurement value of each of the plurality of frequencies, generating, by the network coordinator, a frequency hopping sequence to be used for communication between the network coordinator and the client, the generated hopping sequence including only select frequencies from the plurality of frequencies in a predetermined number of future time slots that minimize a probability of a predetermined number of consecutive frequency hop failures in the predetermined number of future time slots, and notifying the client of the generated frequency hopping sequence to be used for communication.

20 Claims, 8 Drawing Sheets

RELIABLE WIRELESS COMMUNICATION SYSTEM USING ADAPTIVE FREQUENCY HOPPING

CROSS-REFERENCE TO RELATED APPLICATIONS

This application claims the benefit of U.S. Provisional Application No. 61/091,275 filed Aug. 22, 2008, entitled "A Reliable Wireless Communication System Using Adaptive Frequency Hopping", the disclosure of which is incorporated by reference herein.

BACKGROUND

1. Field

The embodiments described herein relate to, in general, a communication system. More particularly, some embodiments concern a wireless communication system using adaptive hopping sequences in which a network coordinator monitors the communication among communication devices in the network and adapts the hopping sequence of the network to minimize the chance that communication is disrupted.

2. Description

A number of environments, including industrial automation applications, may require a highly reliable network for communication. In some applications if several consecutive packets from a controller to/from an input/output (I/O) device (such as a motor switch) are lost or delayed beyond a certain threshold, the automation system is disturbed. Unfortunately, in many areas where an automation network is deployed (e.g., factory halls, train stations, etc.), the RF spectrum is often filled with interference. As a result, devices using traditional wireless technologies such as IEEE 802.11a/b/g/n running on a single frequency may be disrupted. As a result, such wireless technologies are not suitable for direct use in industrial automation applications.

Some previous systems have tried to solve the problem of finding a current optimal frequency (or frequencies) for a communication system. Such prior attempts may be generally classified into the two categories of Dynamic Frequency Selection (DFS) and Adaptive Frequency Hopping (AFH).

Using DFS, all devices in a network cell use a primary frequency for a period of time until the quality of the frequency has deteriorated. At that moment, the entire cell moves to an alternative frequency. The alternative frequency may be announced either before a frequency change is necessary (i.e., proactive) or after it becomes necessary (i.e., reactive).

For reactive DFS systems, a major disadvantage is that when the primary frequency suffers from interference, it becomes difficult or even impossible to announce the alternative frequency reliably such that all devices in the network become aware of the new frequency. Proactive DFS systems are more reliable than reactive ones. However, right after the primary frequency has failed and before a replacement alternative frequency is chosen and made known to all devices in the network, if the alternative frequency also fails, then communication is interrupted. Therefore, DFS systems are fundamentally not highly resilient to interference.

Using AFH, each communication device continuously hops over a number of frequencies. Once a frequency is detected as being unsuitable for further use, the unsuitable frequency will be replaced with another frequency whenever it appears in the hopping sequence. This process is known as frequency re-mapping.

AFH systems may be more resilient to interference because the hopping sequence consists of hops over a number of frequencies. Therefore, unless all of the frequencies in the hopping sequence are impaired by interference, the devices can still communicate with each other, albeit at a much lower throughput and at a higher delay, until the bad frequencies have been remapped to good frequencies. A problem with using AFH for industrial automation (and certain other) applications is that such applications cannot tolerate consecutive packets with a high delay or packet losses. However, frequency remapping is not instantaneous since the clients must first be notified of the new frequency map. To illustrate, consider a simple example where there are 3 frequencies available for frequency hopping, where the current hopping sequence is 1, 2, 3, 1, 2, 3, ... for time slots 1, 2, 3, 4, 5, and 6, respectively. In this example, the hopping sequence repeats every 3 slots even though 6 time slots are shown here. When frequency 1 is determined to be unusable due to interference, it may be replaced with either frequencies 2 or 3. Assuming that frequency 1 is remapped to frequency 2, the new hopping sequence after adaptation is 2, 2, 3, 2, 2, 3, ... for time slots 1 through 6, respectively. If at this moment, frequency 2 also suffers from interference, the system will suffer 2 back-to-back hops from time slot 1 to 2, and from 4 to 5. This type of scenario is not ideal as industrial automation (and other) applications may be sensitive to consecutive losses and delays. Preferably, the adapted hopping sequence should have been 2, 3, 2, 3, 2, 3 ... after the first failure. In such a case, even if one of frequency 2 or 3 were to immediately fail, there would not be 2 consecutive back-to-back bad slots. It is noted that one cannot possibly remap frequencies 1, 2, 3 to achieve the hopping sequence of 2, 3, 2, 3, 2, 3, etc.

As illustrated by the proceeding discussion and brief example, it is seen that the design of the new hopping sequence is an important consideration in keeping a frequency hopping communication system or process operating without interruption.

SUMMARY

To address at least the foregoing, some embodiments provide a system, method, apparatus, and means including a method of adaptive frequency hopping to be used for communication between a network coordinator and a client including determining a frequency quality measurement value for each of a plurality of frequencies a network coordinator can use in a frequency hopping sequence for communicating with a client; classifying each of the plurality of communication frequencies into one of a plurality of different categories based on a relative ranking of the determined frequency quality measurement value of each of the plurality of frequencies; generating, by the network coordinator, a frequency hopping sequence to be used for communication between the network coordinator and the client, the generated hopping sequence including only select frequencies from the plurality of frequencies in a predetermined number of future time slots that minimize a probability of a predetermined number of consecutive frequency hop failures in the predetermined number of future time slots; and notifying the client of the generated frequency hopping sequence to be used for communication between the network coordinator and the client.

In some embodiments, the predetermined number of future time slots of the generated frequency hopping sequence may include a first fixed number of frequencies in the frequency hopping sequence that cannot be changed followed by a remaining number of frequencies that may be changed by the network coordinator.

In some aspects herein, the frequencies selected from the plurality of frequencies to minimize the probability of a predetermined number of consecutive frequency hop failures is determined by obtaining a value, C, for the predetermined number of consecutive frequency hop failures to be avoided in a frequency hopping sequence comprising the plurality of frequencies; and assigning a frequency to a future time slot of the frequency hopping sequence, wherein the frequency assigned to the future time slot is determined by reviewing (C−1) consecutive time slots immediately prior to the future time slot to determine one of the plurality of frequencies not used in the (C−1) consecutive time slots, assigning the determined unused frequency to the future time slot of the frequency hopping sequence, and otherwise assigning one of the plurality of frequencies used a least amount in the (C−1) consecutive time slots immediately prior to the future time slot to the future time slot of the frequency hopping sequence.

BRIEF DESCRIPTION OF THE DRAWINGS

The construction and usage of embodiments will become readily apparent from consideration of the following specification as illustrated in the accompanying drawings, in which like reference numerals designate like parts, and wherein.

DETAILED DESCRIPTION OF SPECIFIC EMBODIMENTS

The following description is provided to enable any person in the art to make and use the described embodiments and sets forth a best mode contemplated by for carrying out some embodiments. Various modifications, however, will remain readily apparent to those in the art.

Figure 1:
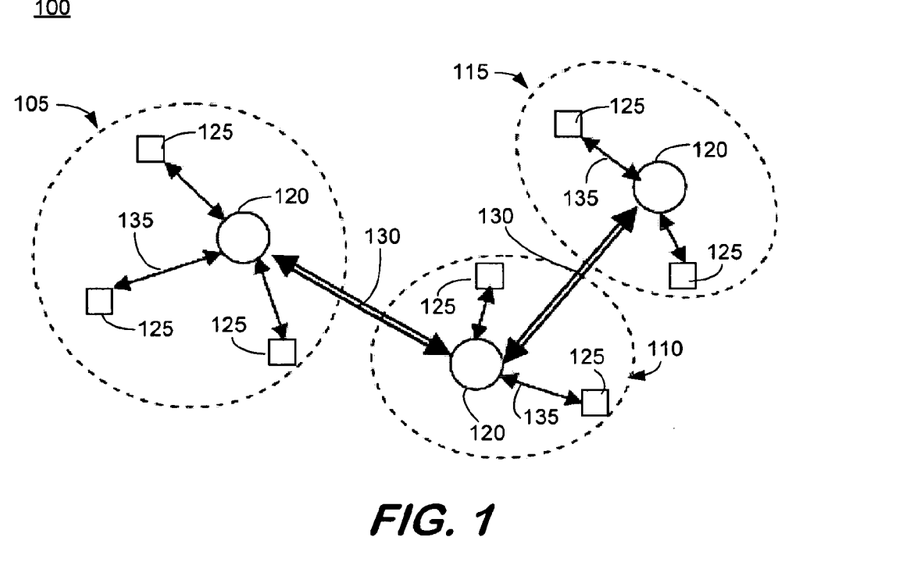
FIG. 1 is an illustration of a frequency hopping communication network, according to some embodiments herein.

Referring to FIG. 1, a network 100 of a wireless communication system is shown. Network 100 comprises two types of communication devices, access points (APs) 120 and client devices 125. APs 120 and clients 125 may comprise any configuration of hardware and software suitable for implementing the methods and processes described herein. Additionally, APs 120 and communication devices 125 may be implemented, at least partially, to operate under the control of and in accordance with program code or instructions relating to the methods described herein and embodied on any tangible medium capable of storing such program code or instructions.

In some embodiments, the present disclosure may relate to different physical layer technologies, including those that are not traditionally considered frequency hopping. For example, wireless networks such as those based on the IEEE 802.11a/b/g/n WLAN standard and the wireless sensor network standard IEEE 802.15.4 use a modulation scheme that is not frequency hopping. As such, these wireless systems were not originally designed to continuously change their operating frequency. However, as long as the hardware (and software) implementations may be configured and/or programmed to change the operating frequency of the communication devices operating on such networks at run time, the methods disclosed herein may be implement over such hardware (and software) implemented systems.

Each AP 120 may communicate with clients 125 associated therewith over communication links 135. Each AP and its associated clients are referred to as a cell. Each cell may correspond to a coverage area for the APs therein. Network 100 includes a number of cells, including cells 105, 110, and 115. Each of the cells 105, 110, and 115 includes an AP 120 and a number of associated communication devices (e.g., clients 125) in communication with the AP. In some embodiments, communication link 135 is a wireless link. APs 120 may communicate with each other, in some embodiments, using wired or wireless links 130.

It should be appreciated that network 100 may include more components than those depicted in FIG. 1. However, for the purpose of clarity in the discussion of the adaption of a hopping sequence herein cells 105, 110, and 115 will primarily focus on the APs 120 and the client communication devices 125.

In accordance with some embodiments herein, communication between APs 120 and clients 125 is bi-directional. APs 120 and clients 125 may therefore transmit and receive communication information or data to and from each other. In some embodiments, communication devices implemented as APs 120 and clients 125 may have a transceiver capable of transmitting and receiving communication data.

Figure 2:
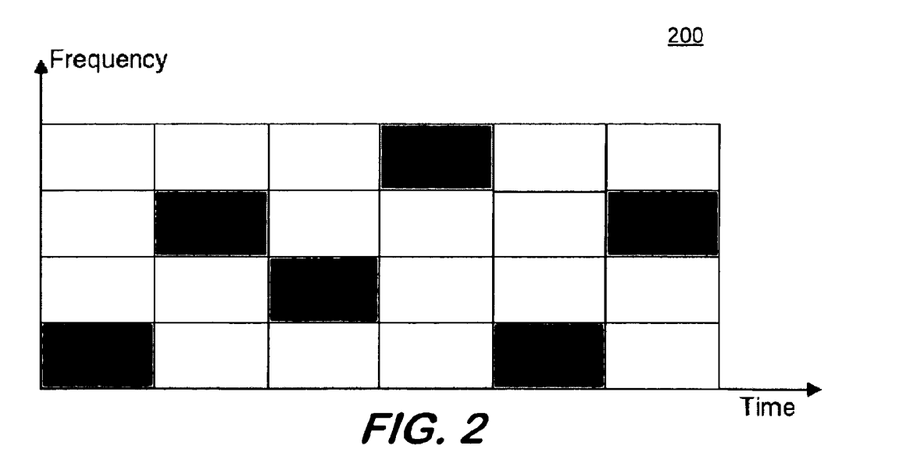
FIG. 2 is a graphical representation of a frequency hopping sequence, according to some embodiments.

In some embodiments, APs 120 and clients 125 may communicate over a plurality of frequencies over a period of time according to a frequency hopping sequence. FIG. 2 provides an illustrative depiction of a hopping sequence of an AP in accordance with some embodiments herein. As shown, the particular communication frequency used by the AP varies as a function of time.

In a frequency hopping (FH) environment, APs 120 and clients 125 must be synchronized to operate on the same frequency at the same time in order to communicate with each other. In some embodiments, each AP 120 communicates with clients 125 in its cell using a hopping sequence of the AP. In some embodiments, the AP is also referred to as a network controller since it may control, at least, the frequency hopping sequence of its associated cell. Cells 105, 110, and 115 may each operate using a frequency hopping sequence different from each other, in order to, for example, eliminate or reduce interference between cells operating in close proximity with each other. In some embodiments, APs 120 may determine or select their hopping frequency independently of each other.

According to some embodiments, the present disclosure provides a reliable communication system using an adaptive frequency hopping sequence that uses a set of frequencies deemed suitable for reliable communication at the moment the frequency is needed. The set of frequencies used in the frequency hopping sequence may change over time.

Figure 3:
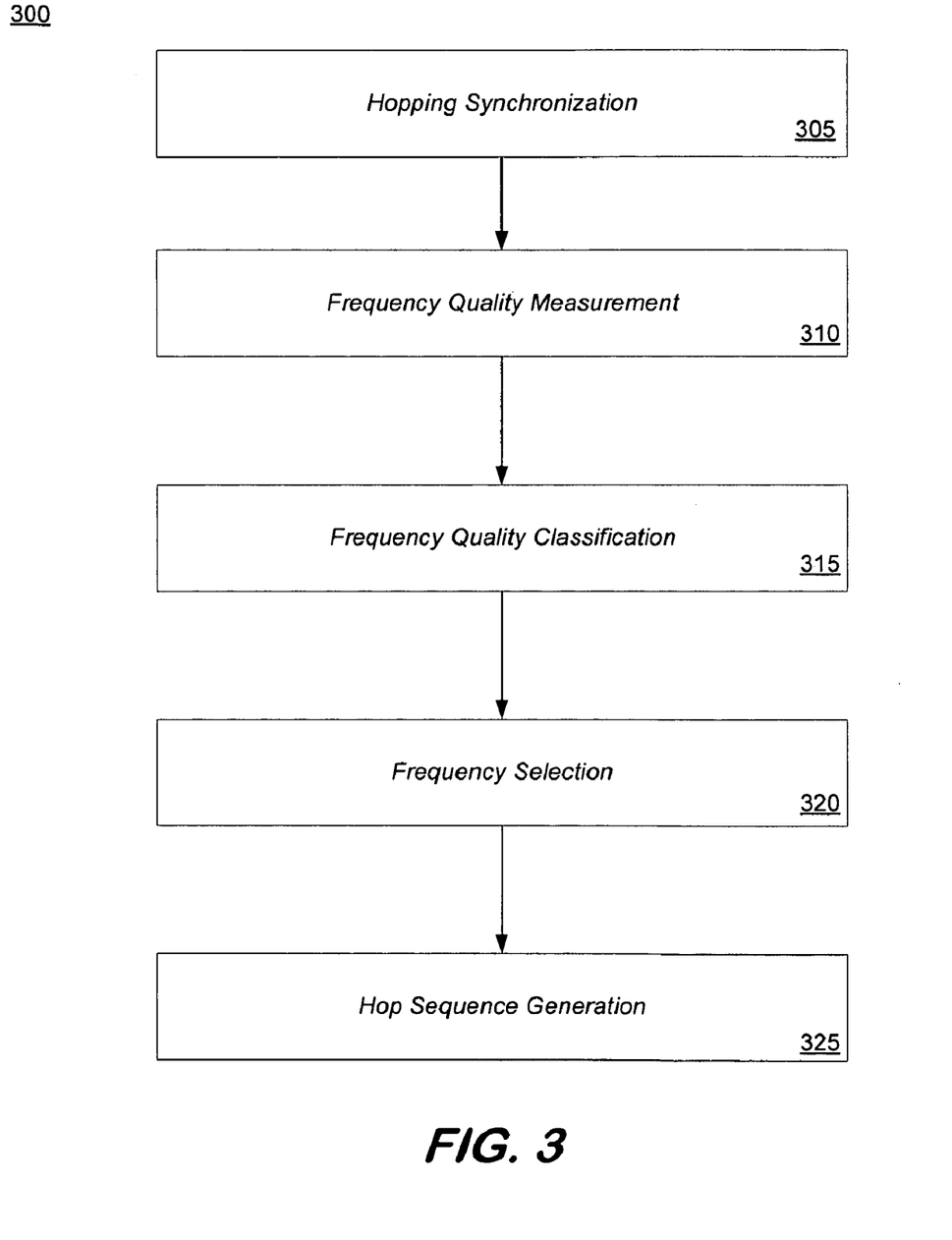
FIG. 3 is an illustrative flow diagram, in accordance with some embodiments herein.

FIG. 3 is an illustrative depiction of a number of processes associated with various embodiments herein. FIG. 3 introduces certain aspects of the present disclosure of the various embodiments, wherein the processes comprising some of the embodiments herein include:

Hopping Synchronization (305)—hopping synchronization refers to a process of an AP notifying clients of the hopping sequence of the AP. That is, the AP informs the clients of the frequencies to use in the new, upcoming few hops. Clients may then follow the advertised hopping sequence of the AP so they can communicate with the AP in a synchronized manner. The AP and clients may exchange data while they are using the same frequency at the same time (i.e., synchronized). Access to the communication medium (e.g., a wireless link) may be controlled either centrally by the AP or achieved through distributed contention.

Frequency Quality Measurement (310)—refers to a process wherein the AP measures, with the assistance of clients in some embodiments, the quality of each frequency with respect to each client in terms of, for example, signal strength, signal quality, packet loss percentage between the AP and the client, etc.

Frequency Quality Classification (315)—refers to a process wherein the AP integrates the frequency quality measurement of each frequency over the different clients and assigns an appropriate quality rating to each frequency.

Frequency Selection (320)—refers to a process wherein the AP evaluates the relative quality of the frequencies and decides which of them are suitable for use in a hopping sequence of the AP. The AP may use hysteresis to prevent a frequency from oscillating between being included and not being included in the hopping sequence.

Hop Sequence Generation (325)—refers to a process of the AP generating a new frequency hopping sequence using the frequencies that are determined suitable for inclusion in the hopping sequence. According to some embodiments herein, the hop sequence generation is based on the processes of Hopping Synchronization 305, Frequency Quality Measurement 310, Frequency Quality Classification 315, and Frequency Selection 320 that are repeated over time.

Regarding frequency hopping synchronization, the hopping sequence used for communication by an AP 120 and the clients 125 within a cell is decided by the AP, and every client in the cell has to follow the same sequence of the AP. In order for all clients 125 within the cell to know the future, upcoming frequency hops of the AP, certain packets sent by the AP contain the future hopping sequence so that the receiving clients may be informed of the hopping sequence.

Figure 4:
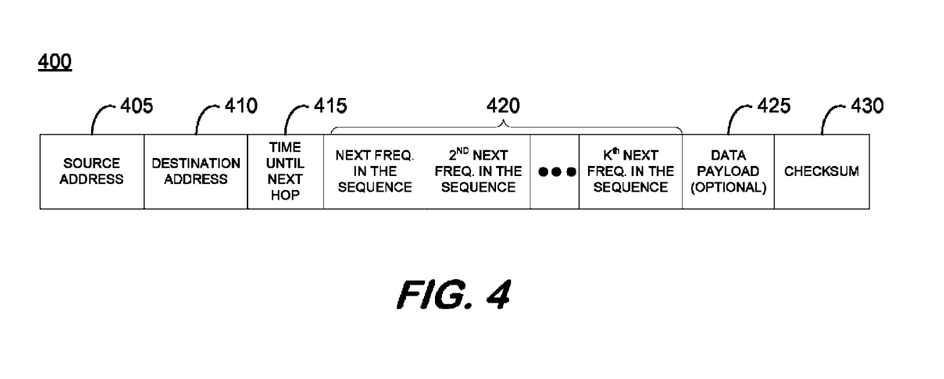
FIG. 4 is an illustrative depiction of an exemplary data packet format, in accordance with some embodiments herein.

FIG. 4 provides an example of formatting used for a data packet 400 transmitted by an AP in accordance with some embodiments herein to facilitate frequency synchronization. Specifically, packet 400 is formatted to include a source address 405, a destination address 410, "time until next hop" data 415, a number of next frequencies 420 in upcoming time slots, a data payload 425 (optional), and a checksum 430.

Source address 405 includes the AP's address since the AP is the transmitter of the current packet 400. Destination address 410 may be either a special broadcast address if the packet is not addressed to a specific client or the address of a specific, destined client. The "time until the next hop" data 415 includes the amount of time left in the current time slot until the next frequency change is scheduled to happen. When the time in a current hop is complete, a new time slot begins, at which time the AP and all of the clients associated with the AP hops to the next frequency indicated as "next frequency in the sequence". The AP publishes the next K frequencies to be used at 420. Accordingly, any client device that can hear the packet (e.g., in range of the AP) may be informed of the hopping sequence of the AP in the upcoming K time slots. The AP generates a hopping sequence that includes known good quality frequencies. The qualities of the frequencies are determined in accordance with aspects described herein.

Figure 5:
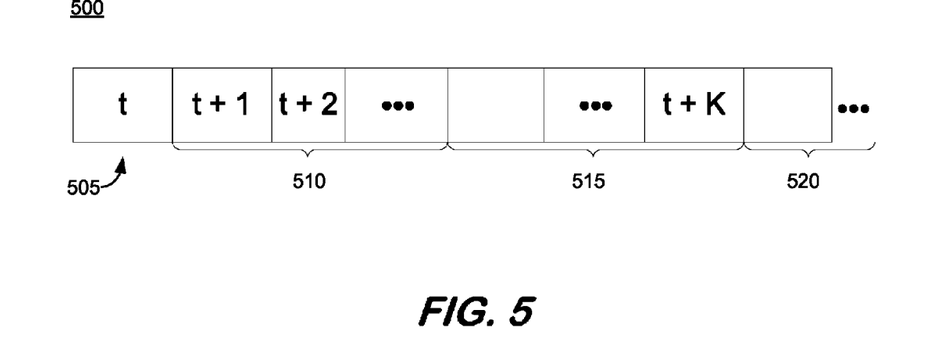
FIG. 5 is an illustrative depiction of an exemplary hopping sequence advertisement format, in accordance with some embodiments herein.

The packets sent by the AP may contain a special field(s) storing the future hopping sequence. The hopping sequence advertised in packet 500 sent by an AP during any particular time slot t 505 refers to the sequence of frequencies used in slots (t+1) to (t+K), as shown in FIG. 5. This hopping sequence may be divided into 2 portions. The first portion refers to a number of slots included in an "Unchangeable Window" 510. Within unchangeable window 510, the AP cannot change the hopping sequence even if the frequencies used in this window suddenly become unsuitable for use. If such changes were allowed to occur within the "unchangeable window" 510, there would be little time for the AP to notify clients of the change in the hopping sequence. As a consequence due to packet losses, some clients may lose hopping synchronization with the AP. To minimize such losses of communication synchronization, the AP is prevented from changing the hopping sequence for the slots that are too close to the current time slot (i.e., those within the "unchangeable window" 510).

Data packet 500 also includes a "changeable window" 515 following the "unchangeable window" 510, during which time the AP may change its hopping sequence. For the time slots in "changeable window" 515, changes to the hopping sequence are allowed. While frequency changes may be made for the time slots in "changeable window" 515, such changes may preferably be minimized in some embodiments. For those time slots 520 following the "changeable window", the hopping sequence may be freely changed.

Referring to the frequency quality measurement of FIG. 3 at 310, the quality of a frequency may vary depending on the particular sender and receiver. From the perspective of a sender, there are a number of possible measures of the quality of a frequency. Some metrics used in determining the quality of a frequency include:

1. The total number of transmissions (including retransmissions) needed before an acknowledgement is received by the sender;
2. The signal strength of data received by the receiver;
3. The signal strength of the acknowledgement packet returned to the sender;
4. The gaps in the sequence numbers of packets from the same sender as observed by the receiver; and
5. Frequency utilization the fraction of the medium for which the medium is sensed to be busy (i.e., having a carrier signal).

It is noted that in some embodiments, APs 120 and client 125 may be either a sender or a receiver. Additionally, information available at the sender or receiver may be relayed back to the other side. According to some embodiments, only the information available on the AP 120 to measure the quality of a frequency is used, for simplicity reasons of discussion and not as a limitation of the present disclosure.

Figure 6:
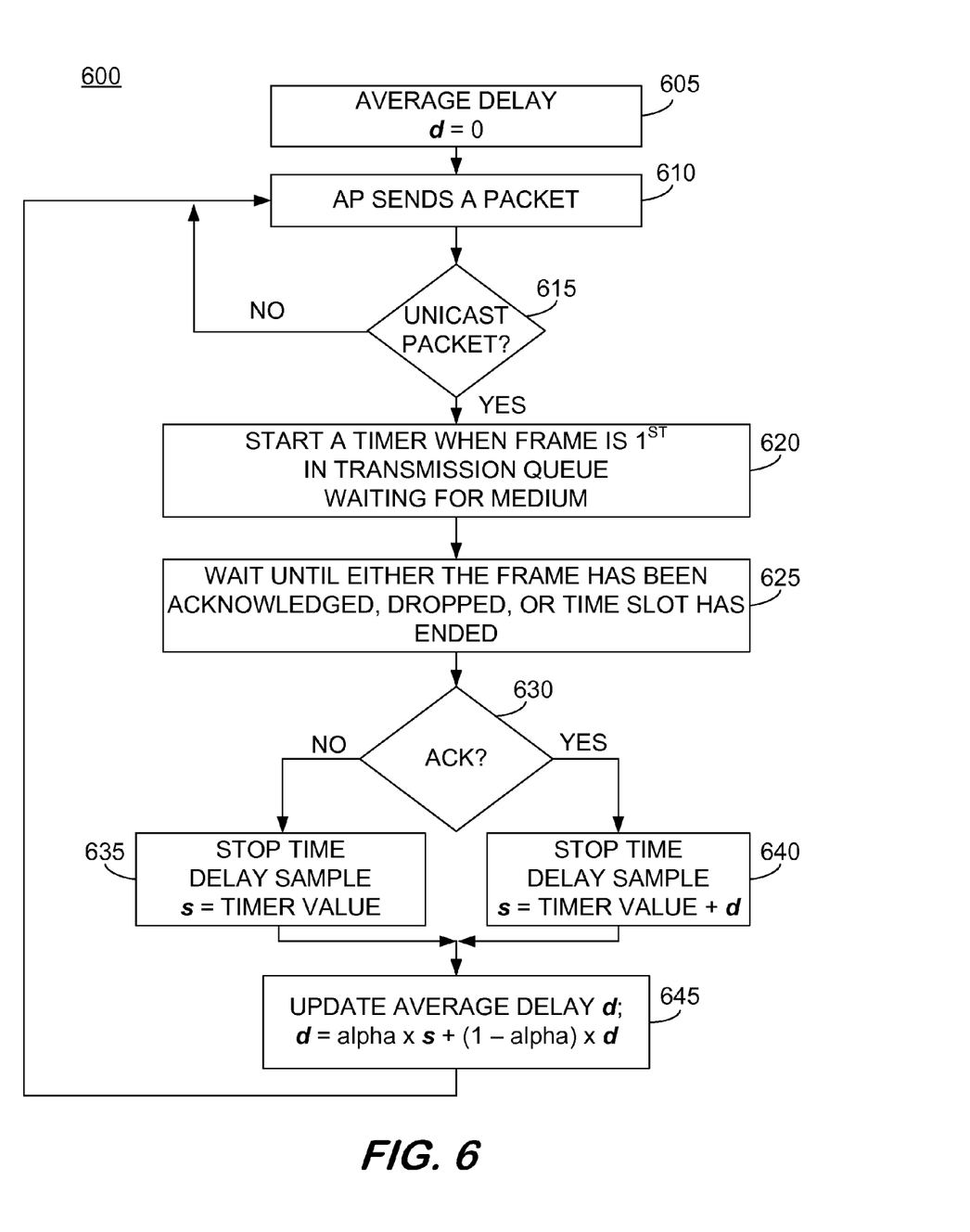
FIG. 6 is a flow diagram illustrating a frequency quality measurement method, in accordance with some embodiments herein.

FIG. 6 relates to a frequency quality measurement method 600, based on an average delay experienced by packets sent on a frequency. It should be appreciated that other methods for determining a frequency quality measurement may be used in embodiments herein. Still referring to FIG. 6 and starting at operation 605, an average delay for a frequency is set to zero. At operation 610 the AP sends a data packet and a determination is made at 615 whether the sent packet is a unicast packet. For every unicast packet sent by the AP, a measurement is made of the time elapsed from when the frame reaches the front of a transmission queue at operation 620 until an acknowledgement regarding the packet is received, the frequency is dropped (due to excessive retires), or until the current hop ends, whichever occurs first as indicated at operation 625. If the frame has been successfully acknowledged by the client at operation 630, then a delay sample s is simply the delay from when the frame is ready for medium contention until the frame is acknowledged, as shown at operations 640 and 645. Otherwise, the delay sample is the sum of the delay incurred until the point of failure or a frequency switch and the current running average delay, as shown at operations 635 and 645.

From the delay sample, the running average delay may be updated by using an Exponentially Weighed Moving Average filter (EWMA) with an alpha value between 0 and 1, according to one embodiment. A value around 0.1 has been observed to work well by Applicant. The average delay d is tracked on a per client per frequency basis. For each frequency, the delay of each frequency is calculated by averaging across all clients to get an average delay on a per frequency basis. This per frequency average delay is used as a Frequency Quality Measurement.

In some embodiments, different packets may have different lengths. Therefore, it is more accurate to account for the different packet lengths in the delay calculation such that longer packets are not penalized for taking a longer time to transmit. Accordingly, packet length may be accounted for by subtracting the additional time required to transmit a packet due to extra data length compared to a nominal size packet, according to one embodiment.

After the determination of the frequency quality measurement (i.e., a score) for each the plurality of frequencies used in a frequency hopping sequence is obtained, an AP classifies the frequencies as indicated at operation 315 of FIG. 3. The frequencies may be classified into multiple groups, including "Good", "Medium", and "Bad" based on the relative frequency scores of the frequencies.

Figure 7:
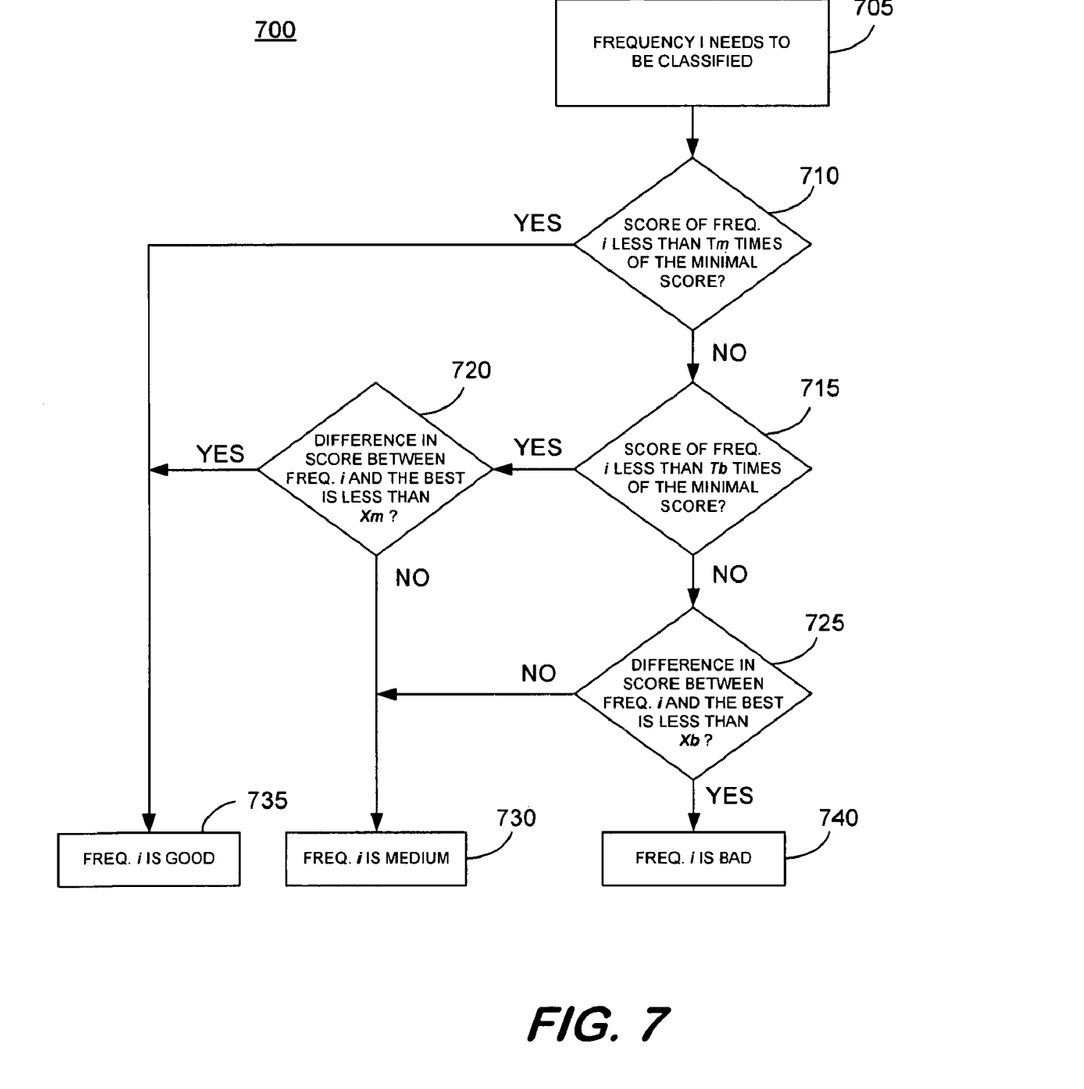
FIG. 7 is a flow diagram illustrating a frequency classification method, in accordance with some embodiments herein.

FIG. 7 illustrates one embodiment of a frequency classification method 700. Method 700 starts with a recognition that a frequency i needs to be classified at operation 705. At operation 710, the delay (or other frequency quality measurement) of each frequency is compared to that of the best frequency (i.e., the one with the lowest delay). If the delay of frequency i is within Tm times or no more than Xm of the best frequency as determined at operation 710, 715, and 720, the frequency is considered "Good" at operation 735. Similarly, if the delay is more than Tm times of the best frequency (at operation 710) and Xm of the best frequency but less than Tb (at operation 715) or within Xb of the best, it is considered "Medium" at operation 730. Otherwise, the frequencies are considered "Bad" after arriving at operation 740.

As an illustrative example, Tm=150% and Xm=1 ms, while Tb=250% and Xb=2 ms, according to a particular embodiment. Using the method of classifying the frequencies as illustrated in FIG. 7 provides a mechanism for classifying frequencies based on their determined frequency quality measurement.

It is noted that the frequency classification method of FIG. 7 uses a relative scale for classifying the frequencies. The reason for using a relative scale rather than an absolute scale, according to one embodiment, is that the present disclosure is interested in generating a hopping sequence that uses the best available frequencies even if none of the frequencies are completely free of interference. According to one embodiment, the additional condition to group together frequencies less than Xm or Xb of each other together helps to avoid a case where a small amount of noise in the measurements cause frequencies that are essentially of the same quality to be classified differently.

Regarding the frequency selection process introduced at operation 325 of FIG. 3, an instantaneous classification is assigned to each frequency. However, due to the randomness intrinsic in the delay (or other, for example, utilization) measurements, the classification of a frequency may fluctuate. For example, a "Bad" frequency may not always have a high delay at all times. However, due to the history of a particular "Bad" frequency, the frequency should preferably not be used extensively as soon as the current score has improved.

To avoid oscillation of the set of frequencies to include in a hopping sequence, hysterisis may be applied to the set of frequencies included in the hopping sequences to determine a long term average for each of the frequencies. A long term average behavior of each frequency is called the state of the frequency herein. In general, "Good" frequencies should be used continuously in the generation of the hopping sequence. "Medium" frequencies however should preferably be tested frequently, but not used to carry much traffic. "Bad" frequencies meanwhile should be tested infrequently.

Figure 8:
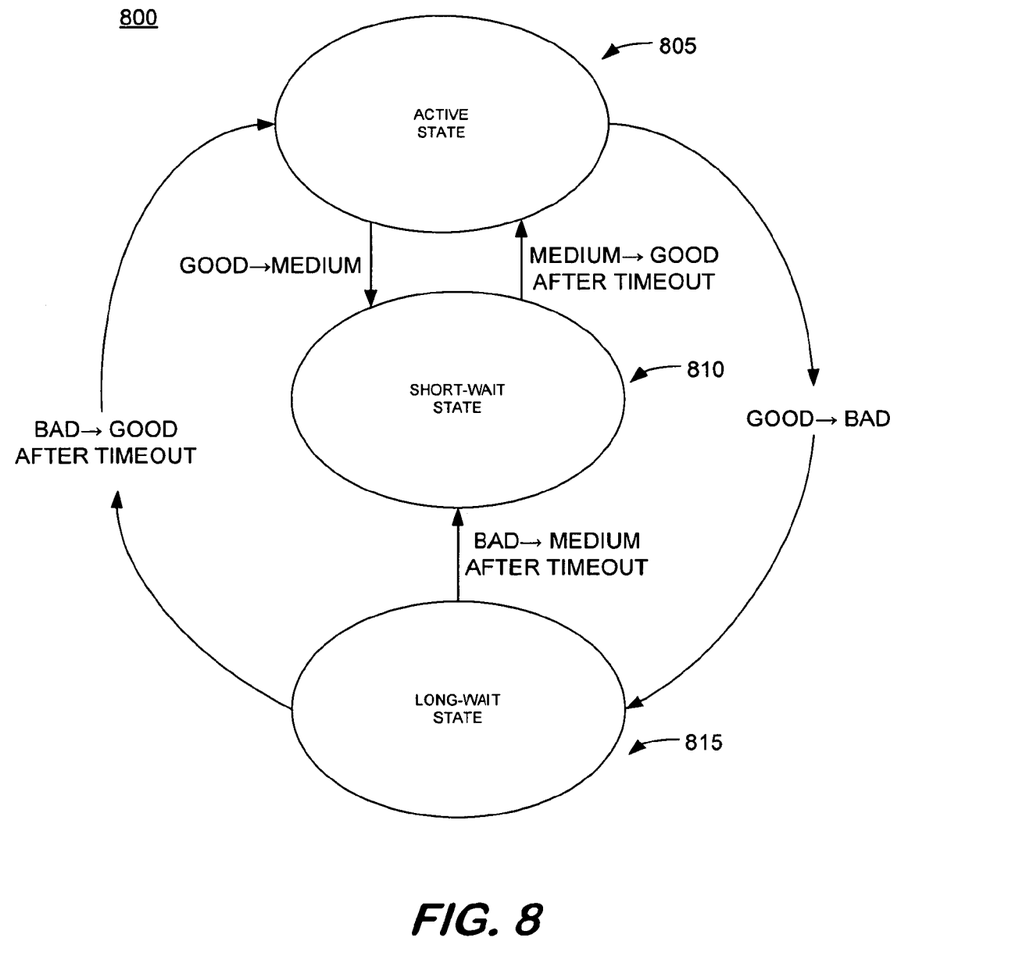
FIG. 8 is a graphical illustrative of various states of frequencies, in accordance with some embodiments herein.

However, as noted above, "Good", "Medium", and "Bad" are instantaneous classifications. According to one embodiment, there are three (3) possible states of any frequency, regardless of their instantaneous classification. Those three states may include an Active state 805, a Short-Wait state 810, and Long-Wait state 815, as shown in FIG. 8. Each frequency may have a simple state machine associated with it to keep track of its current state.

In some embodiments, each frequency may initially be placed in the Active state 805. If a frequency is always classified as Good (as determined by the method of FIG. 7, for example), the frequency will remain in Active state 805. When the frequency classification changes to Medium or Bad, its state also changes to Short-Wait state 810 or Long-Wait state 815, respectively, as shown in FIG. 8. Once a frequency enters in a Short-Wait state 810, it may stay there for some period of time (e.g., on the order of 10 s) before returning to Active state 805. During the time the frequency is in the Short-Wait state 810, it will be occasionally tested. For example, when a certain amount of time elapses as tracked by a timer, the classification of the frequency may be checked. If the classification has improved to Good, then the frequency will be promoted to the Active state 805. If the classification has deteriorated to the Bad state 815, then it will be demoted to the Long-Wait state 815. Otherwise, the frequency will remain in the Short-Wait state 810. Similarly, once a frequency enters the Long-Wait state 815, it will have to stay in that state for some time, usually on the order of a minute or more, before it can be considered for promotion. This timeout value is much larger than the timeout value for the Short-Wait state 810. When the timeout finally expires, the state of the frequency may be changed to Active state 805 or Short-Wait state 810, or remain at Long-Wait state 815, depending on the classification of the frequency being Good, Medium, or Bad respectively. A frequency in Long-Wait state 815 is tested less frequently than frequencies in the Short-Wait state 810. Testing a frequency, in some embodiments, means that it is inserted into the hopping sequence, and hence it is given a chance to carry a small amount of traffic for the duration of one (1) time slot. In this manner, the AP is allowed to collect new statistics about the delay to transmit a frame successfully on that frequency. Due to the EWMA averaging on the delay, the score of each frequency does not improve dramatically from packet to packet.

An important aspect of the present disclosure is the adaptive hopping sequence generation herein. For example, a frequency hopping system in accordance with the present disclosure may consider the needs of industrial automation and other applications where reliability can be maintained by preventing consecutive packets to/from the same client from failing (i.e., being delayed or lost). According to some embodiments, the system and methods herein may combat consecutive failures by combining the techniques of frequency hopping and adaptive frequency selection. Frequency hopping aspects herein send packets on different frequencies and guarantee, on a short time scale, the probability that multiple consecutive packets failure due to interference or other wireless frequency impairment is minimized. Adaptive frequency aspects herein automatically monitor and select only the best frequencies for communication selection, thereby guaranteeing, on a longer time scale, that only the best available frequencies are used in the frequency hopping sequence. Therefore, frequencies that are impaired will not have any impact on the performance of the system in the long run. These two mechanisms complement each other since they work on different time scales.

If a system or method were to only use random frequency hopping, for example, impaired frequencies are not removed from the hopping sequence. As a result, as the number of failed frequencies increases, the chance of having a failed frequency appearing back-to-back also increases. On the other hand, if a system or method were to only use adaptive frequency selection, it might choose the optimal frequency to use at any time. However, as soon as that optimal frequency fails, the system would have to scramble to find a backup frequency. Before a backup frequency may be found, the control application connection will have already been broken.

According to one embodiment, the adaptive hopping sequence generation methods herein may minimize the chance that k consecutive frequency hops in a hopping sequence land on impaired frequencies. To illustrate this aspect for a hopping sequence generated in accordance with the present disclosure, a brief example will be presented using 5 frequencies, named "1" to "5". In this example, frequencies 1, 2, and 3 have been classified as Good frequencies in an Active state. Frequency 4 is classified Medium in a Short-Wait state, and frequency 5 is classified Bad in Long-Wait state.

Figure 9A:
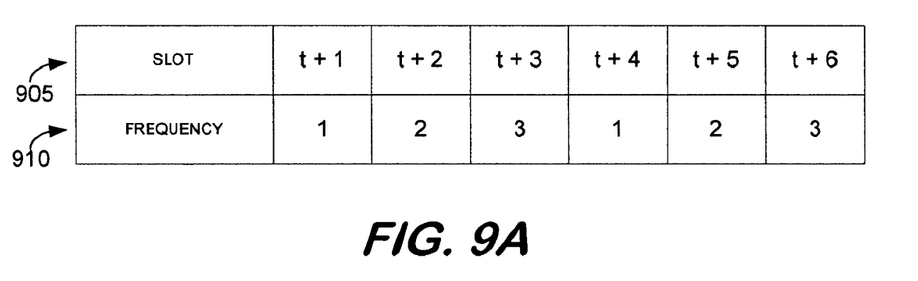
FIGS. 9A and 9B are illustrative depictions of hopping frequency time slots, in accordance with some embodiments herein.

For the present example, suppose the current unchangeable window as advertised by an AP during t-th slot is as shown in FIG. 9A. As shown the next, upcoming new frequencies for time slots (t+1) to (t+6) are advertised. It is noted that the frequency hopping sequence uses the available Good frequencies in the Active state.

Figure 9B:
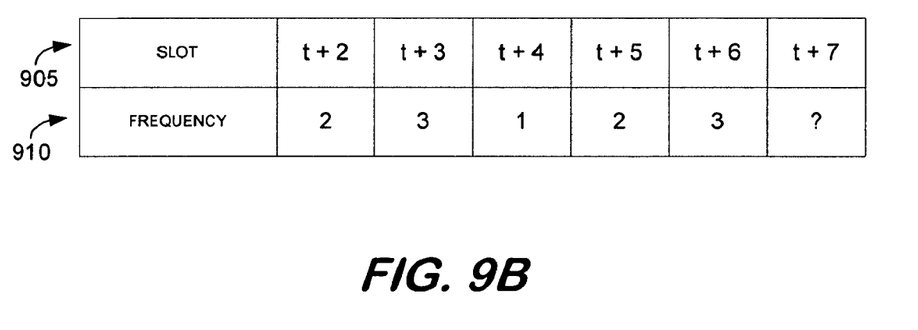

When a new time slot (e.g., the t+1 th) begins, the unchangeable window is that shown in FIG. 9B. At this point, the $t+7^{th}$ hop into the future has to be decided and there are many possible choices (frequency "1" through frequency "5"). To determine which frequency is the optimal choice, the metric of our optimization is needed. As an example, suppose we are trying to minimize the chance of 3 consecutive failed slots (i.e., C=3). In this case, we only need to look at the frequencies used in the time slots t+5, t+6, and t+7. In this instance, the best choice for slot t+7 is frequency 1. As another example, suppose that we are trying to minimize the chance of 4 consecutive failed slots. In this case, a determination is made regarding what frequencies used in time slots t+4, t+5, t+6, and t+7. In this case, the best choice for t+7 is frequency 4. That is, one of the Medium frequencies is used since frequency 4 is the relative "best" frequency not used in the time slots t+4, t+5, t+6.

Figure 10:
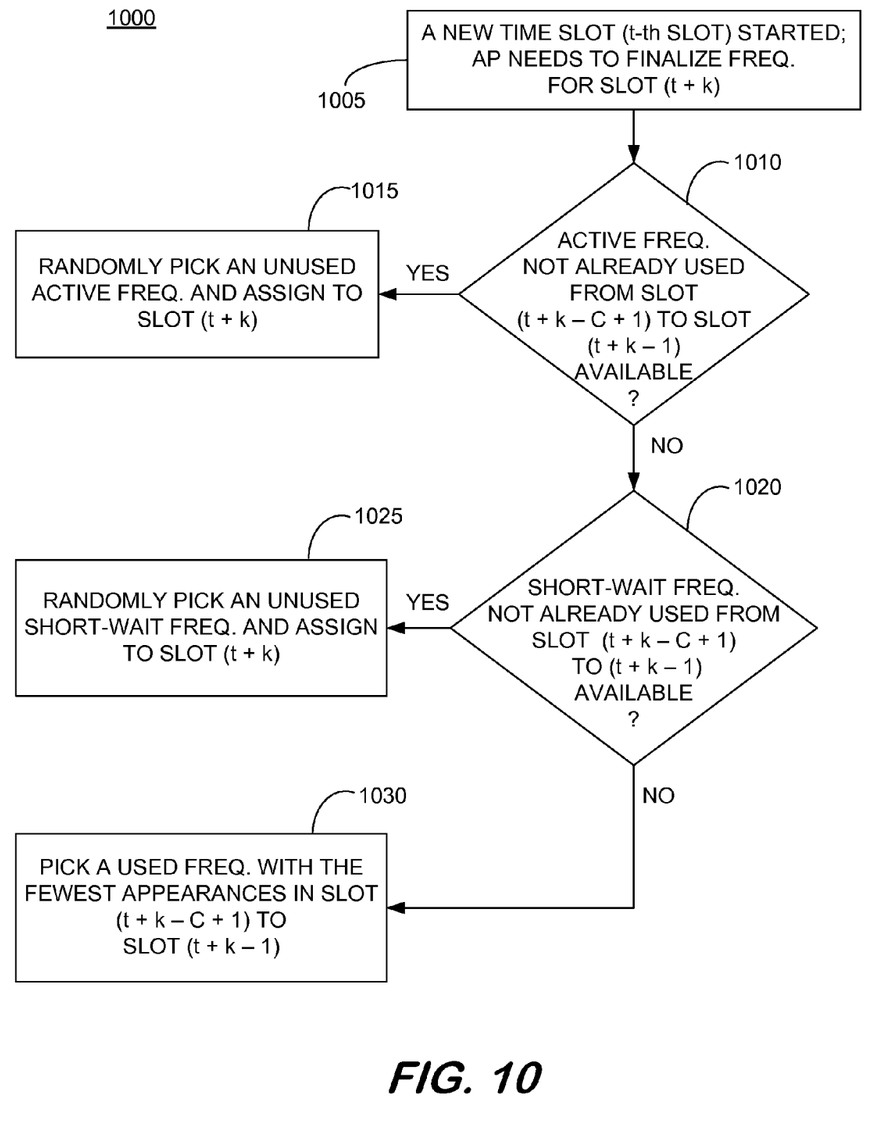
FIG. 10 is a flow diagram illustrating a frequency hop sequence generation method, in accordance with some embodiments herein.

According to one embodiment, an illustrative procedure for choosing the best frequency that minimizes the chance of C consecutive failures is shown in FIG. 10. At operation 1005, a new time slot, for example the t-th slot, is started. The AP thus needs to finalize or determine the frequency for a time slot (t+k). At operation 1010, a determination is made whether an active frequency that has not been used in the time slots (t+k−C+1) through (t+k−1). If an active frequency is available that has not been used in these time slots, then one of such available frequencies is selected for use in the (t+k) time slot at operation 1015. If no such active frequency is available, then a determination is made at operation 1020 whether a short-wait sate frequency is available that has not been used in the time slots (t+k−C+1) through (t+k−1). If a short-wait state frequency is available that has not been used in these time slots, then one of those available frequencies is selected for use in the (t+k) time slot at operation 1025. If no such short-wait frequency is available, then a frequency that has been used the least number of times in time slots (t+k−C+1) through (t+k−1) is selected for use in the (t+k) time slot at operation 1030. It is noted that the (C−1) time slots prior to the time slot being determined, (t+k), need to be examined according to method 1000.

Those in the art will appreciate that various adaptations and modifications of the above-described embodiments can be configured without departing from the scope and spirit of the claims. Therefore, it is to be understood that the claims may be practiced other than as specifically described herein.

What is claimed is:

1. A method of adaptive frequency hopping to be used for communication between a network coordinator and a client, the method comprising:

determining a frequency quality measurement value for each of a plurality of frequencies a network coordinator can use in a frequency hopping sequence for communicating with a client;

classifying each of the plurality of communication frequencies into one of a plurality of different categories based on a relative ranking of the determined frequency quality measurement value of each of the plurality of frequencies;

generating, by the network coordinator, a frequency hopping sequence to be used for communication between the network coordinator and the client, the generated hopping sequence including only select frequencies from the plurality of frequencies in a predetermined number of future time slots that minimize a probability of a predetermined number of consecutive frequency hop failures in the predetermined number of future time slots, wherein the predetermined number of future time slots of the generated frequency hopping sequence comprises a first fixed number of frequencies in the frequency hopping sequence that cannot be changed followed by a remaining number of frequencies that can be changed; and notifying the client of the generated frequency hopping sequence to be used for communication between the network coordinator and the client.

2. The method of claim 1, wherein the select frequencies from the plurality of frequencies that minimize the probability of a predetermined number of consecutive frequency hop failures is determined by:

obtaining a value, C, for the predetermined number of consecutive frequency hop failures to be avoided in a frequency hopping sequence comprising the plurality of frequencies; and assigning a frequency to a future time slot of the frequency hopping sequence, wherein the frequency assigned to the future time slot is determined by:
reviewing (C−1) consecutive time slots immediately prior to the future time slot to determine one of the plurality of frequencies not used in the (C−1) consecutive time slots;
assigning the determined unused frequency to the future time slot of the frequency hopping sequence; and
otherwise assigning one of the plurality of frequencies used a least amount in the (C−1) consecutive time slots immediately prior to the future time slot to the future time slot of the frequency hopping sequence.

3. The method of claim 2, wherein the (C−1) consecutive time slots immediately prior to the future time slot are reviewed to determine all of the plurality of frequencies not used in the (C−1) consecutive time slots.

4. The method of claim 1, wherein the determined quality measurement value for each of the plurality of communication frequencies includes determining on overall frequency quality measurement value for each of the plurality of frequencies over all of the associated clients.

5. The method of claim 1, wherein the quality measurement value for each of the plurality of communication frequencies is determined based on at least a delay measurement at the communication network coordinator.

6. The method of claim 1, wherein the quality measurement value for each of the plurality of communication frequencies is determined based on at least an utilization measurement at the communication network coordinator.

7. The method of claim 5, wherein the classifying of each of the plurality of frequencies is determined based on a ranking of a delay value of each frequency relative to one other frequency of the plurality of frequencies having a lowest delay value.

8. The method of claim 5, wherein the classifying of each of the plurality of frequencies is determined based on a ranking of an utilization value of each frequency relative to one other frequency of the plurality of frequencies having a lowest delay value.

9. The method of claim 1, wherein the classifying further comprises determining how often to test of each of the plurality of frequencies and grouping each of the plurality of communication frequencies into one of a finite plurality of different states based on a determined test state of each of the plurality of frequencies.

10. The method of claim 9, wherein the determined test state for each of the plurality of frequencies represents a long term average behavior of each of the plurality of frequencies.

11. The method of claim 9, wherein the generation of frequency hopping sequence further ensures that each of the frequencies will be added in the hopping sequence to update quality measurement statistics at a predetermined pace based on the test states of all frequencies.

12. A frequency hopping communication system, the system comprising:
a client; and
a network controller to communicate with the client using frequency hopping, the network controller operative to:
determine a frequency quality measurement value for each of a plurality of frequencies a network coordinator can use in a frequency hopping sequence for communicating with a client;
classify each of the plurality of communication frequencies into one of a plurality of different categories based on a relative ranking of the determined frequency quality measurement value of each of the plurality of frequencies;
generate a frequency hopping sequence to be used for communication between the network coordinator and the client, the generated hopping sequence including only select frequencies from the plurality of frequencies in a predetermined number of future time slots that minimize a probability of a predetermined number of consecutive frequency hop failures in the predetermined number of future time slots, wherein the predetermined number of future time slots of the generated frequency hopping sequence comprises a first fixed number of frequencies in the frequency hopping sequence that cannot be changed followed by a remaining number of frequencies that can be changed; and
notify the client of the generated frequency hopping sequence to be used for communication between the network coordinator and the client.

13. The system of claim 12, wherein the select frequencies from the plurality of frequencies that minimize the probability of a predetermined number of consecutive frequency hop failures is determined by:
obtaining a value, C, for the predetermined number of consecutive frequency hop failures to be avoided in a frequency hopping sequence comprising the plurality of frequencies; and
assigning a frequency to a future time slot of the frequency hopping sequence, wherein the frequency assigned to the future time slot is determined by:
reviewing (C−1) consecutive time slots immediately prior to the future time slot to determine one of the plurality of frequencies not used in the (C−1) consecutive time slots;
assigning the determined unused frequency to the future time slot of the frequency hopping sequence; and
otherwise assigning one of the plurality of frequencies used a least amount in the (C−1) consecutive time slots immediately prior to the future time slot to the future time slot of the frequency hopping sequence.

14. The system of claim 13, wherein the (C−1) consecutive time slots immediately prior to the future time slot are reviewed to determine all of the plurality of frequencies not used in the (C−1) consecutive time slots.

15. The system of claim 12, wherein the determined quality measurement value for each of the plurality of communication frequencies includes determining on overall frequency quality measurement value for each of the plurality of frequencies over all of the associated clients.

16. The system of claim 12, wherein the quality measurement value for each of the plurality of communication frequencies is determined based on at least one of a delay measurement and an utilization measurement at the communication network coordinator.

17. The system of claim 16, wherein the classifying of each of the plurality of frequencies is determined based on at least one of a ranking of a delay value and an utilization value of each frequency relative to one other frequency of the plurality of frequencies having a lowest delay value.

18. The system of claim 12, wherein the classifying further comprises determining how often to test of each of the plurality of frequencies and grouping each of the plurality of communication frequencies into one of a finite plurality of different states based on a determined test state of each of the plurality of frequencies.

19. The system of claim 18, wherein the determined test state for each of the plurality of frequencies represents a long term average behavior of each of the plurality of frequencies.

20. The system of claim 18, wherein the generation of frequency hopping sequence further ensures that each of the frequencies will be added in the hopping sequence to update quality measurement statistics at a predetermined pace based on the test states of all frequencies.

* * * * *